United States Patent [19]

Seah

[11] Patent Number: 4,710,326
[45] Date of Patent: Dec. 1, 1987

[54] CORRUGATED PACKING AND METHODS OF USE

[76] Inventor: Alexander M. Seah, 5800 Leedale, Houston, Tex. 77016

[21] Appl. No.: 902,189

[22] Filed: Aug. 29, 1986

[51] Int. Cl.$^4$ ............................................. B01F 3/04
[52] U.S. Cl. .................................... 261/112; 261/113
[58] Field of Search ............................... 261/112, 113

[56] References Cited

U.S. PATENT DOCUMENTS

| | | | |
|---|---|---|---|
| 1,561,044 | 11/1925 | Alexander | 261/113 |
| 2,206,440 | 7/1940 | Walker | 261/112 |
| 3,343,821 | 9/1967 | Winn et al. | 261/112 |
| 3,830,684 | 8/1974 | Hamon | 261/112 |
| 3,963,810 | 6/1976 | Holmberg et al. | 261/112 |
| 4,107,241 | 8/1978 | Braun | 261/112 |
| 4,186,159 | 1/1980 | Huber | 261/112 |
| 4,337,217 | 6/1982 | Braun | 261/112 |
| 4,604,247 | 8/1986 | Chen et al. | 261/112 |

FOREIGN PATENT DOCUMENTS

| | | | |
|---|---|---|---|
| 2032292 | 8/1971 | Fed. Rep. of Germany | 261/112 |
| 2060178 | 11/1971 | Fed. Rep. of Germany | 261/112 |
| 713530 | 9/1966 | Italy | 261/113 |
| 294635 | 4/1971 | U.S.S.R. | 261/112 |
| 563999 | 12/1977 | U.S.S.R. | 261/113 |

Primary Examiner—Tim Miles
Attorney, Agent, or Firm—Browning, Bushman, Zamecki & Anderson

[57] ABSTRACT

Disclosed is a technique for packing an exchange chamber to facilitate interaction between two fluids. Corrugated packing plates are arranged with the corrugations of next corrugated plates running in different directions. The plates feature slots breaking the ridges of the plates and having corresponding tabs projecting into the corrugation grooves. The slots may provide drip points for liquid as one fluid moving through the slots in addition to permitting flow of the second fluid through the slots. A lip at the intersection of a slot and the ridge it breaks captures liquid bridging the slot to direct such liquid to the underside of the ridge.

49 Claims, 14 Drawing Figures

CORRUGATED PACKING AND METHODS OF USEP

BACKGROUND OF THE INVENTION

1. Field of the Invention

The present invention pertains to techniques for enhancing exchange processes between two fluids. More particularly, the present invention relates to packing elements and systems for use in exchange chambers, such as utilized in mass transfer or heat exchange processes, for example.

2. Description of Prior Art

Many commercial chemical and other processes involve mass transfer or heat exchange, and utilize packed columns or chambers to carry out these steps. Such processes can include distillation, absorption and desorption, gas cleaning and drying, and various biological processes, such as filtrations. Two fluids, usually a gas and a liquid (although two liquids may be utilized) are intermingled within a chamber, typically as countercurrent flow streams wherein the two fluids move generally in opposite senses along the same flow axis. In a co-current system, the two fluids move generally in the same senses along a single flow axis; a cross-current facility features the two fluids moving along separate intersecting flow axes.

The mass transfer rates and/or the reaction rates of the processes increases with increasing amounts of effective surface area that can be wetted by liquid within the chamber and over which the two fluids can then interface with one another. Packing elements are placed in the chamber to increase the amount of surface area available for such interfacing. One type of packing system that has been used includes a multi-layered construction of parallel, corrugated plates.

The plates are generally made of woven sheet or solid sheet and are placed in contact with one another such that the corrugations, or ridges and grooves, are at an angle to a general flow direction while the plates themselves are disposed in planes parallel to such a direction. Consequently, the fluid flow is deflected from the general flow direction, and may result in non-uniform distribution of a liquid at various points along its general flow path. Such non-uniformity can be a severe disadvantage in an exchange process wherein uniform distribution is essential when one of the fluids is a gas.

A further disadvantage of the corrugated-plate packing elements is due to the tendency of liquid to flow down the corrugations rather than evenly coating the plate surfaces while flowing from corrugation to corrugation. Such "channeling" may significantly decrease the exchange efficiency due to low degree of fluid mixing and reduced interfacial area.

It is advantageous and desirable to provide a packing technique to enhance the opportunity for interaction between two fluids in an exchange process by reducing channeling effects of liquid flow, increasing the wetted surface area for fluid-fluid interaction, reducing the resistance to gas flow and generally increasing the intermixing and mutual exposure between two fluids in the exchange process. The present invention provides a technique to accomplish these ends.

SUMMARY OF THE INVENTION

A packing element according to the present invention for use in an exchange process between two fluids, comprises a corrugated plate having at least one slot and corresponding tab extending and partially displaced from the slot, permitting flow of one or both fluids through the slot. A system of corrugated plates may be formed whereby the plates are positioned mutually parallel, with the corrugations of each plate forming a non-parallel relationship with the corrugations of the next plate. In such a system, one or more of the plates may feature at least one such slot and tab combination.

Each tab may extend from at least one end of the corresponding slot, where the tab may be attached to the plate. The slots may straddle the corrugation ridges, either being centered on the ridges or partially displaced relative thereto. The tabs then extend within the grooved sides of the corrugations and may serve as structural support members for the corrugations.

A slot may be straight, or bent, being defined at least in part by a shaped edge of the plate having at least one projection extending generally into the slot. In the latter case, a slot projection may be positioned on the downside of a corrugation ridge, and serve as a drip point for liquid. Such a drip point may be positioned above a tab of the same corrugated plate, for example, so that liquid dripping from the slot projection may fall on the tab below. A tab may also feature a shaped edge forming at least one drip point for liquid falling from the tab. The projections may be any shape in general. Projections in the form of V points are illustrated herein. Where a slot intersects a ridge, the downward edge of the slot may feature a lip extended to capture liquid tending to bridge the slot so that such liquid may move on and wet the underside surface of the corrugation generally below the slot. One form of lip is constructed between two V points of a tab before the plate is corrugated.

Next adjacent corrugated plates may cooperate to define, at least in part, cells in which one or more slots and tabs may be located. Such cells may be so defined by a ridge and the next adjacent ridge of one corrugated plate cooperating with a ridge and the next adjacent ridge of the next adjacent corrugated plate.

In a method of the invention, two fluids may be permitted to flow through the corrugated plate system, with a liquid fluid passing downwardly through the slots, dripping off of the slot projections. If the liquid flow rate is sufficiently high that liquid tends to bridge the slots, the slot lip in each case may capture the bridging liquid and direct it to the underside of the respective corrugation for additional wetting.

The liquid dripping from the slot projections and even from the tab projections further distributes the liquid along the corrugated plates and increases the exposure of the liquid to a fluid, with the second fluid also able to pass through the slots. The slots and tabs also enhance fluid turbulence, particularly in the case of a gas.

As used herein, an exchange process includes a heat exchange, a mass transfer or any other chemical and/or physical process in which energy or mass in any form is interchanged between at least two fluids. An exchange chamber may be any enclosure, including a column or tower, in which the interacting fluids are made to flow, and wherein the packing may be positioned according to the present invention. A flow axis is a general direction along which fluid moves through such an enclosure in the absence of packing, for example. The insertion of packing causes the fluid to experience local directions from the flow axis.

DESCRIPTION OF PREFERRED EMBODIMENTS

Figure 1:
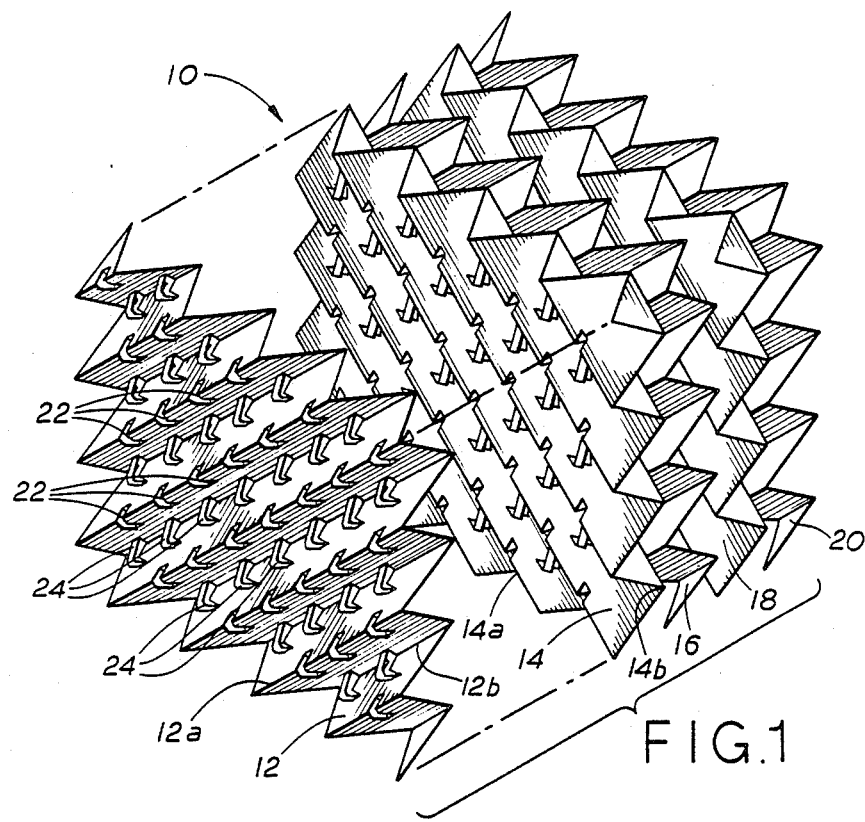
FIG. 1 is an isometric view, partly exploded, of a system of slotted and tabbed corrugated packing plates according to the present invention.
Figure 2:
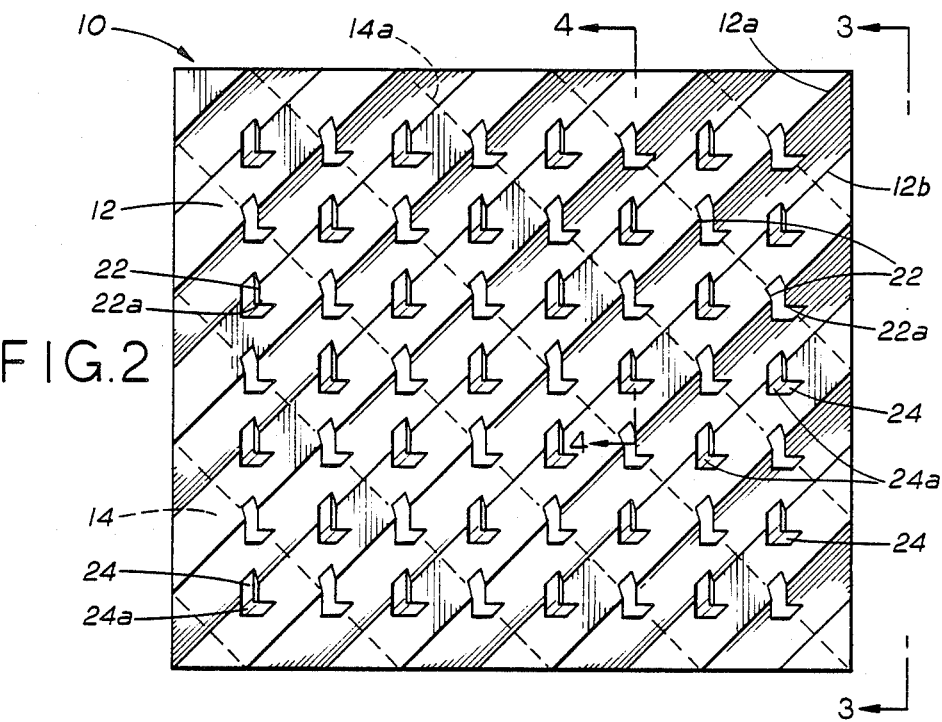
FIG. 2 is a side elevation of the packing system of FIG. 1, showing the foremost packing element plate and, in phantom, the ridge lines of the next adjacent packing element.
Figure 3:
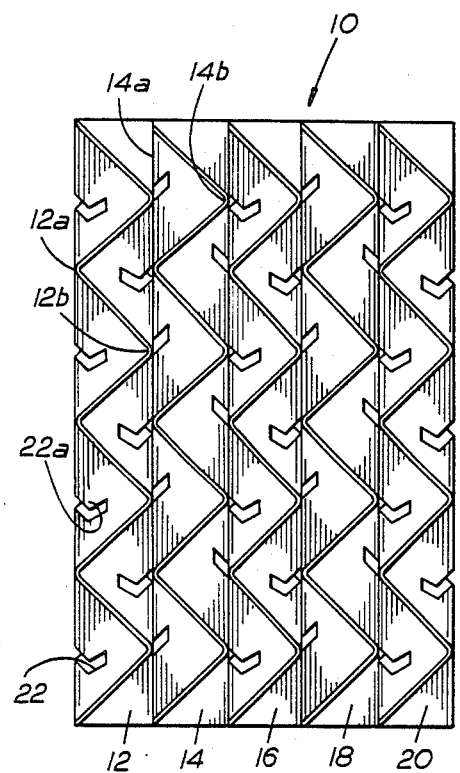
FIG. 3 is an end elevation of the packing system of FIGS. 1 and 2, taken along line 3—3 of FIG. 2.
Figure 4:
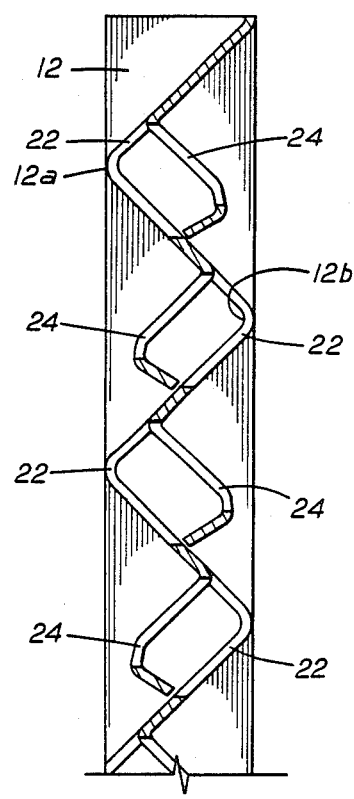
FIG. 4 is an enlarged, fragmentary view in cross section of the packing system, taken along line 4—4 of FIG. 2.

A packing system according to the present invention is indicated generally at 10 in FIGS. 1-3, and is shown comprising a plurality (five are illustrated) of packing elements 12, 14, 16, 18 and 20. Each of the packing elements 12-20 is constructed in the same form, and oriented in the system 10 as indicated. For example, the foremost element 12 illustrated in FIGS. 1 and 2, comprises a plate, or sheet, formed in corrugations providing, on each face of the plate, one or more ridges 12a alternating with one or more grooves 12b, it being understood that a ridge on one side of the plate is generally accompanied by a groove directly opposite on the other face of the plate.

Figure 5:
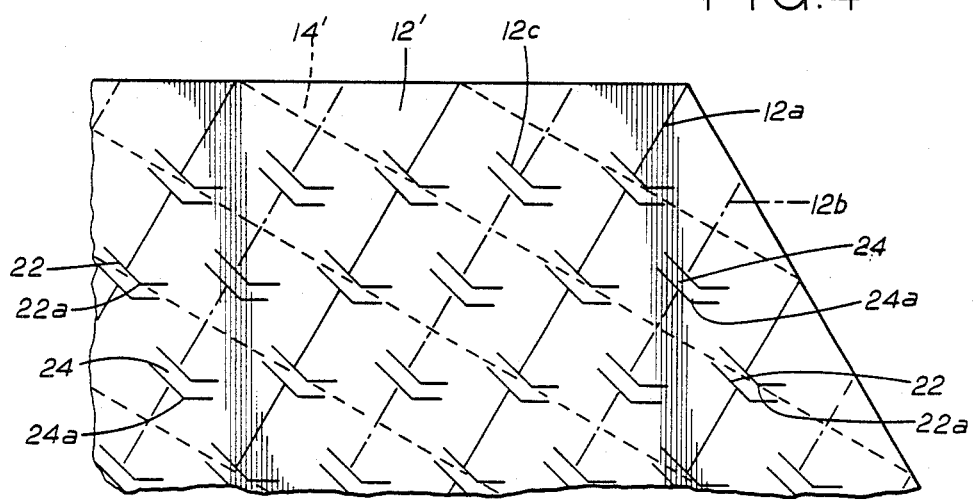
FIG. 5 is an enlarged, fragmentary section of a plate with slots and tabs cut but prior to the formation of corrugations and extension of the tabs, showing the locations where the ridges and grooves form upon corrugation of the plate, and showing, in phantom, the location of ridge line locations of a next adjacent plate in a packing system.

FIG. 5 shows a portion of the foremost plate 12 before the plate has been corrugated, and the plate is indicated as 12' in that figure. The locations along which ridges are to be formed on the visible side of the plate 12' are indicated by solid lines 12a, and the location of grooves to be formed on that side are indicated by broken lines 12b. As indicated, the shape of the unfolded plate 12' is a rhomboid, which, in elevation, becomes a rectangle as shown in FIG. 2 when the corrugation folds are made as illustrated. As shown in FIG. 2, the folding of the plate 12' results in corrugations, that is, ridges 12a and grooves 12b, at 45 degrees relative to the edges of the folded plate 12 in elevation.

With all plates 12-20 corrugated as the foremost plate 12, the plates may be positioned to form the system 10 by reversing alternating plates so that the corrugations of one plate are oriented at an angle relative to the corrugations adjacent to the next plate or plates, in this case the angle being 90 degrees.

Each plate 12-20 may be equipped with one or more slots 22 and corresponding tabs 24 as illustrated. In FIG. 5, the flat plate 12' is shown with an array of markings 12c at which positions the plate may be cut to form an array of slots and tabs when the plate is corrugated. The cuts may be positioned to cross the lines 12a and 12b along which corrugation ridges and grooves, respectively, are to be formed as illustrated. When the plate 12' is corrugated, the tabs 24 may be pulled away from the slots 22 so that the ridges are broken by open slots and the corresponding tab in each case extends away from the slot on the groove side of the plate. The tabs 24 are thus displaced, in part, from the slots 22 at whose ends the tabs are connected to the plate 12. To provide sufficient material to so displace the tabs 24, and provide more gas flow area about the tabs, the interior angle of the fold forming a corrugation may be less than ninety degrees, and about sixty degrees is suggested.

In the embodiment illustrated in FIGS. 1-5, the cuts made to form the slots 22 and tabs 24 are angled so as to produce, for example, a V-shaped edge 22a for each slot protruding into and defining, in part, the border of the opening of the slot, and a V-shaped edge 24a for each tab as illustrated. Further, the cuts to form the slots 22 and tabs 24 are offset from the lines along which the ridges 12a and grooves 12b are to be formed in the plate 12'. The result, which may be appreciated by reference to FIGS. 1-3, is an array of slots 22 having projections in the form of V-shaped points 22a on the downsides of their respective ridges, and tabs 24 having projections in the form of V-shaped points 24a on the downsides of their respective grooves 12b.

When a system comprising one or more corrugated packing elements according to the present invention is utilized in an exchange enclosure, the orientation of the plate or plates may be generally parallel to the flow axis of one or both of the fluids involved in the exchange process, but with the direction along which the corrugation folds are made being non-parallel to the flow axis of at least one of the fluids in the case of each plate. For example, in FIGS. 1-4, wherein the corrugations of plates run generally diagonally, that is, at forty-five degree angles relative to the vertical, the flow axis of a liquid may be vertical, with the liquid moving generally downwardly, and the flow axis of a gas may be horizontal, parallel to the plane of the page of FIG. 2, or vertical, with gas flow in a general upward direction. Then, the slots 22 at the locations of the slot V points 22a, and the tabs 24 at the location of the tab V points 24a, are generally L-shaped. However, the V points 22a and 24a also point in a general downward direction identified by the corresponding corrugation folds (down and to the left in FIG. 2 for plate 12). As the liquid moves generally downwardly through the packing system, there is a general drift of liquid along the corrugation direction of each packing plate. Consequently, the liquid may run along a plate surface and accumulate at the slot V points 22a and at the tab V points 24a to form drops in each case which then drop downwardly from the corresponding V points. As may be appreciated by reference to FIGS. 1 and 4, with a packing plate 12 oriented vertically as illustrated, a slot V point 22a is located generally above the tab 22 of the next adjacent groove 12b of the same plate. Consequently, a liquid drip from a slot V point 22a may fall directly down on the tab 24 below. The slot V point 22a may be bent outwardly to adjust its position over the tab 24 below, and to orient the slot V point closer to a vertical configuration to enhance its liquid accumulating ability to form drops.

The breaks in the ridges 12a due to the slots 22 provide passages for enhanced gas flow through the packing system 10, and generally reduce the flow resistance of gas through the system. Additionally, the slots 24 allow liquid to pass from one side of a plate 12 to the opposite side to enhance the distribution of the liquid over the plate surfaces. Thus, liquid flowing along the surface on one side of the plate 12 between a groove 12b and a ridge 12a may flow through a slot 24, forming one or more drops and falling downwardly toward the tab 22 below. The movement of the fluid from the slot V drip point 22a to the tab 24 below exposes the liquid generally on all sides to gas flow; likewise, liquid dripping from a tab V drip point 24a to the plate surface between a groove 12b and ridge 12a below is also exposed during its fall to gas flow generally on all sides. The bending of a slot projection as discussed hereinbefore also breaks up the gas flow and may add turbulence to the gas flow.

The behavior of liquid flow through the packing system 10 may be affected, to some extent, by the rate of flow of the liquid. For example, for a given viscosity, the flow rate of liquid along a packing element 12 may be sufficiently high that liquid flowing along the surface between a groove 12b and a ridge 12a may bridge across a slot 22 rather than fall through from the slot V point 22a. The bridging liquid will generally continue to move on the top side of the plate surface between the groove 12b and the ridge 12a. The width of the slot 22 may be increased to provide a sufficiently large gap to prevent bridging where possible.

Figure 11:
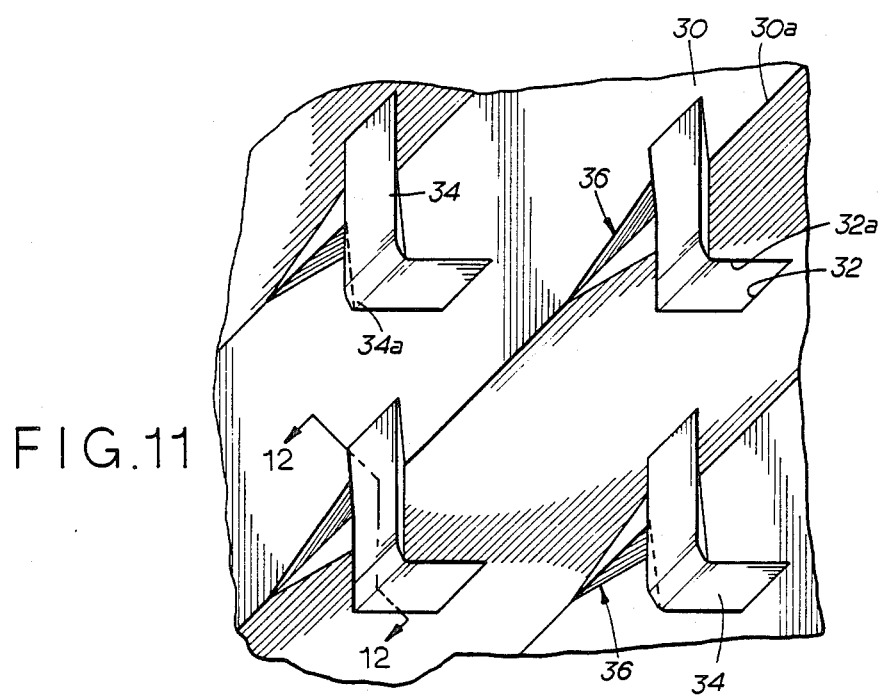
FIG. 11 is an enlarged, fragmentary side elevation of a packing plate according to the present invention, showing the construction of a lip at the intersection of a slot and a ridge.
Figure 12:
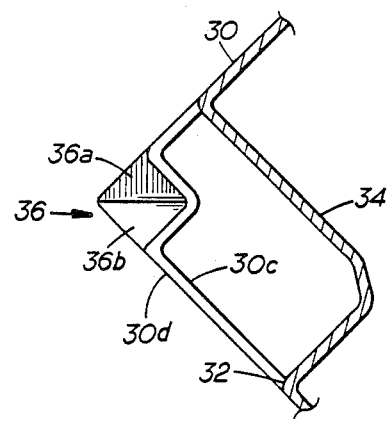
FIG. 12 is an enlarged fragmentary view in cross section of a tab and slot, including a lip, taken along line 12—12 of FIG. 11.

FIGS. 11 and 12 illustrate portions of a packing element plate 30 having V-shaped slots 32 and corresponding V-shaped tabs 34, with slot drip points 32a and tab drip points 34a. Along the surface defining, in part, a slot 32 where the slot intersects a ridge 30a, and particularly at the lower edge of the slot and ridge intersection, the plate is creased into a lip shown generally at 36, extending into the groove side of the plate at that location. Each lip 36 features an upper surface 36a and a lower surface 36b which combine to form a scoop. The lower surface 36b is positioned such that liquid tending to bridge the groove 32 may, at least in part, be captured in the scoop by the lower surface 36b and directed along the underside surface of the plate 30 between the ridge 30a and the groove 30b on the opposite side of the plate from which the liquid started. More particularly, and as shown in FIG. 12, the liquid may pass through the slot 32 from the plate surface 30c above the slot 32 to the plate surface 30d below the slot by way of being captured by the lip surface 36b as the liquid bridges the slot. In this way, the distribution of the flowing liquid over packing system surfaces is increased, thus increasing the interactive surfaces for the liquid and gas exchange process to include underside surfaces of the corrugations.

Figure 13:
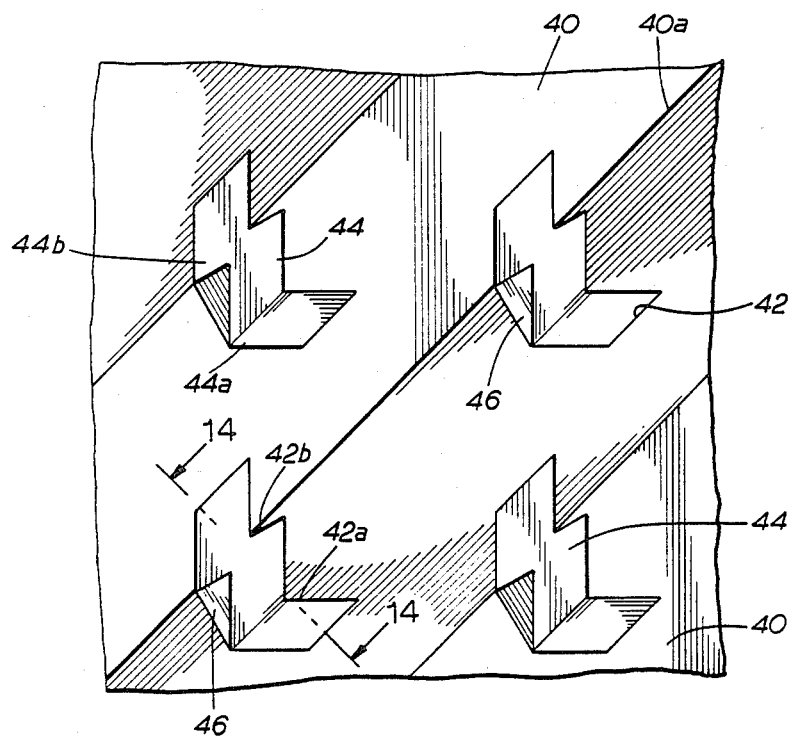
FIG. 13 is a view similar to FIG. 11 but showing a different construction of a lip and slot.
Figure 14:
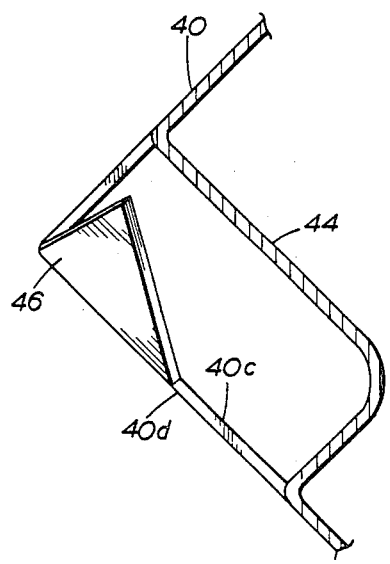
FIG. 14 is an enlarged fragmentary view in cross section of the tab, slot and lip shown in FIG. 13, taken along line 14—14 of FIG. 13.

FIGS. 13 and 14 illustrate portions of another packing element plate 40 having W-shaped slots 42 and corresponding W-shaped tabs 44, with slot drip projections in the form of V points 42a and tab drip projections in the form of V points 44a and 44b, respectively. Before the plate 40 is corrugated, it is broken by W-shaped cuts to define the slot and tab edges such that the slot and tab points 42b and 44b, respectively, lie along the intended ridge lines. When the plate 40 is corrugated, the slot V point 42a may provide a drip point located generally downward from the ridge line similar to the slot V point 22a in the case of the V-shaped slots of plate 12 in FIGS. 1–3. Similarly, the tab V point 44b may be positioned on an L to serve as a drip point generally downward from the corresponding groove line similar to the tab V points 24a of the plate 12 in FIGS. 1–3. Additionally, each W-shaped tab 44 of plate 40 features a second V point 44b generally higher than the drip point 44a, but which may also serve as a drip point.

The recess in the cut forming the tab V points 44a and 44b provides an upwardly-extending, V-shaped lip 46 which protrudes generally into the slot 42 when the plate 40 is corrugated. The lip 46 may be angled generally upwardly from the plane of the corrugation surface, as shown in FIGS. 13 and 14. Then, liquid moving generally downwardly along the upper plate surface 40c encountering the slot 42 and tending to bridge the slot may be captured, at least in part, by the upwardly-extending lip 46 and directed to the underside plate surface 40d. Thus, the distribution of the flowing liquid over the packing system surfaces is increased to include underside surfaces of the corrugations to increase the interactive surfaces for the liquid and the gas exchange process. It will be appreciated that the cut in the plate 40 to form the upper portion of each slot, establishing the slot points 42a and 42b, may be V-shaped rather than W-shaped, eliminating the ridge point 42b while retaining the drip point 42a.

Figures 8, 9, 10:
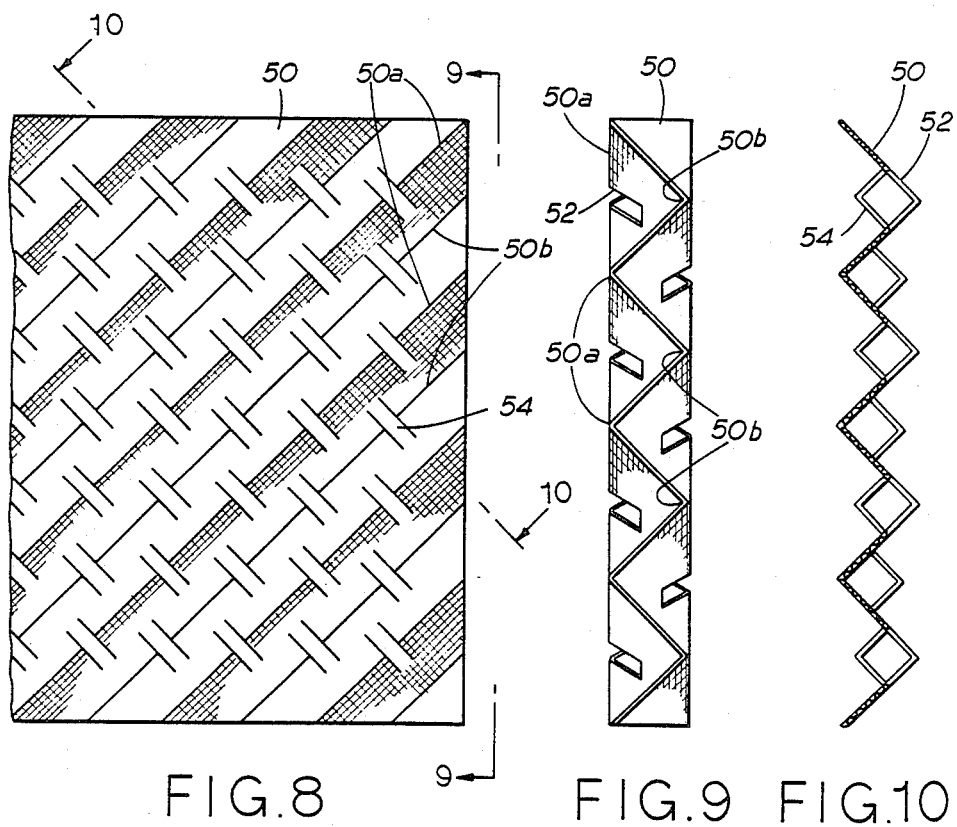
FIG. 8 is a fragmentary side elevation of a packing plate formed of mesh and having straight slots and tabs.
FIG. 9 is a side elevation of the mesh packing element, taken along line 9—9 of FIG. 8.
FIG. 10 is a cross section of the mesh packing plate, taken along line 10—10 of FIG. 8.

In general the packing element plates may be made from any material sufficiently rigid to be corrugated and retain its shape when positioned within an exchange enclosure, for example. Sheet metal that is continuous other than for the breaks provided by the slots and tabs may be employed as illustrated in FIGS. 1–5, 11 and 12. However, other types of materials may also be utilized. For example, FIGS. 8–10 illustrate portions of a packing element sheet 50 that is in the form of a mesh, with corrugation ridges 50a and grooves 50b. The mesh plate 50 is cut to form slots 52 and corresponding tabs 54 across the ridge lines 50a in much the same manner as the continuous sheet plate 12 is provided with slots 22 and tabs 24. However, the slots 52 and tabs 54 of the mesh plate 50 are not structured to provide the V-shaped drip points, and are bisected by the ridge lines 50a, that is, the slots and tabs are generally centered on the corrugation ridges.

The mesh quality of the plate 50 allows the passage of low viscosity liquid through the plate for liquid flow on virtually all plate surfaces without the need for a lip such as shown at 36 in FIGS. 11 and 12 or such as the lip 46 in FIGS. 13 and 14. Further, low viscosity liquid able to pass through the mesh to wet both sides of the plate 50 will tend to bridge the gaps in the ridge lines provided by the slots 52 only at high flow rates, for sufficiently wide slots. Otherwise, liquid encountering a slot 52 will tend to pass through the slot and drip downwardly onto the plate surface below.

Figure 6:
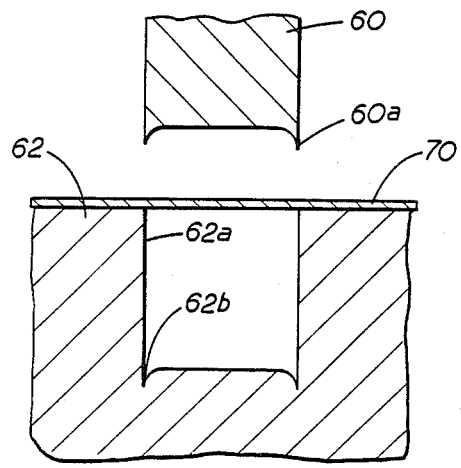
FIG. 6 is a side elevation in cross section of a stamp and die in position to cut a slot and form a tab in a packing element according to the present invention.
Figure 7:
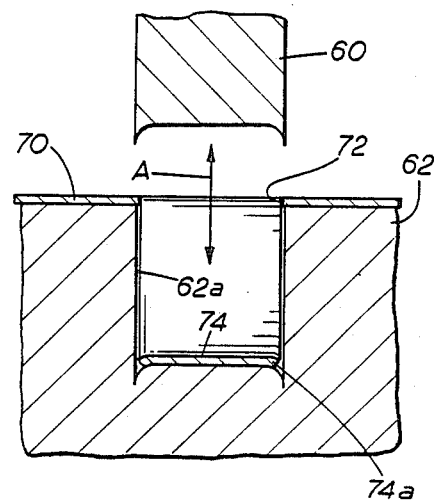
FIG. 7 is a view similar to FIG. 6, but showing the slot and tab formed.

The slots and tabs of a packing element according to the present invention may be formed by stamping the plate of which the element is constructed. FIGS. 6 and 7 show a combination of a stamp 60 and a die 62 shaped to form slots and tabs in a packing element plate according to the present invention. A plate 70′ that has not yet been corrugated is placed in position across the top surface of the die 62. The stamp 60 is moved sharply downwardly into the interior shape 62a of the die to cut a slot 72 and form a tab 74 with the material removed to form the slot, as indicated by the arrow A, which also indicates the subsequent removal of the stamp 60 from the die interior. The plate 70 may then be lifted from the die 62, withdrawing the tab 74 from the interior 62a of the die.

To facilitate removal of the tab 74 from the die interior 62a, and to give a strengthening bevel to at least a portion of the tab 74, the stamp 60 features downward interior curvature along each cutting edge 60a. The die 62 features generally complimentarily shaped receiving trenches 62b. Consequently, when the stamp 60 extends the tab 74 to the bottom of the die interior 62a, the tab material is molded to form a downwardly-extending curved edge 74a, as illustrated in FIG. 7. Thereafter, as the plate 70 is lifted from the die 62, the downward curvature of the tab edges 74a facilitates removal of the tab 74 from the die interior 62a without bending or distortion of the tab due to dragging of the tab along the interior walls of the die.

Providing at least portions of tab edges beveled, as illustrated in FIG. 7, strengthens the tabs. Further, since the tabs extend across grooves of the plates, the tabs act as support struts between corrugation surfaces to further strengthen the packing plate to retain its corrugated configuration. Generally, the tabs may be further shaped as desired, to insure placement under a slot V drip point to receive liquid dripping therefrom, for example. Such additional bending and shaping may be appreciated by reference to the tabs 24 illustrated in FIG. 4, wherein the tabs are so bent to insure placement under corresponding slot V drip points.

In addition to enhancing the mingling of two fluids passing through the packing system, the slots and tabs of such a system provide additional avenues for flow through by the two liquids, and break up the flow of each liquid. For example, the dripping of the liquids through the slots onto the tabs, and from the tabs onto lower surfaces, provide liquid movement which would not ordinarily be present. The slots not only provide an avenue for passage of gas through the plates, but may add to the turbulence of the gas flow.

It will be appreciated by reference to FIGS. 1–5 that adjacent packing plates define an area, or cell, by cooperation between a pair of mutually adjacent corrugation ridges on one plate and a pair of mutually adjacent corrugation ridges on the next plate where the two pairs of ridges face each other. The slots and tabs of the plates may be so positioned that a selected number of slots and tabs of one such plate is positioned within such a cell.

While slots and tabs with single drip points and tabs with double drip points are shown and described herein, it will be appreciated that slots and tabs having any number of projections, or drip points, may be utilized. Further, the slot and tab drip projections may be rounded, pointed, or any appropriate shape to permit liquid dripping therefrom.

It will be appreciated that a single packing element such as 12 may provide the packing system for an exchange process. Further, the actual periphery of the packing elements may vary from that illustrated herein to a particular shape accommodating the specific exchange enclosure in which the system is to be utilized, for example. The flow axes for the fluids involved may be at different angles rather than the vertical and/or horizontal discussed hereinbefore in relation to FIGS. 1–3, but it is preferred that corrugations not be parallel to a flow axis for either fluid. While the packing system 10 as illustrated in FIGS. 1 and 3 has corrugated packing elements directly mutually adjacent, the packing plates may be spaced apart and even interspersed with other packing devices or sheets (not shown). Further, the array of slots and tabs on a given sheet may be varied in a regular patent other than that illustrated herein, or in an irregular pattern. The number of slots and tabs, and their density on a packing element, may be varied, and a packing element may comprise just one such slot and tab combination. Finally, not all corrugated elements need be provided with slots and tabs in a given packing system.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. A packing system for use in an exchange chamber wherein two fluids may interact, comprising:
   a. a plurality of corrugated plates positioned mutually parallel, with the corrugations of each of said plates forming a non-parallel relationship with the corrugations of the next corrugated plate; and
   b. at least one of said plates comprising at least one slot and corresponding tab connected to the plate at the ends of the slot, straddling a corrugation ridge with the tab extending from the slot and within the groove side of the corrugation.

2. A system as defined in claim 1 wherein at least one slot is defined, in part, by a shaped edge having at least one projection extending generally into said slot so that liquid as one said fluid may drip from at least one said slot projection.

3. A system as defined in claim 2 wherein a projection of at least one slot is positioned generally over a tab so that said liquid may drip from said slot projection onto said tab.

4. A system as defined in claim 3 wherein said slots and tabs are partially displaced generally downwardly from corrugation ridges of said plates.

5. A system as defined in claim 1 wherein at least one tab includes a shaped edge having at least one projection protruding from said tab so that liquid as one said fluid may drip from said tab projection.

6. A system as defined in claim 1 further comprising a lip at the lower edge of at least one slot generally where said slot intersects a corrugation ridge of a plate, with said lip extending to permit liquid as one said fluid bridging said slot to pass to the underside of the plate corrugation.

7. A system as defined in claim 1 wherein each slot and corresponding tab are generally centered on a corrugation ridge of a plate.

8. A system as defined in claim 1 wherein each slot and corresponding tab are partially displaced generally downward from a corrugation ridge of a plate.

9. A system as defined in claim 1 wherein the material of at least some of said plates is, at least in part, generally continuous.

10. A system as defined in claim 1 wherein the material of at least some of said plates comprises a mesh.

11. A system as defined in claim 1 wherein said slots and tabs of each said plate are arranged along said plate in a generally regular array.

12. A system as defined in claim 1 wherein:
a. a corrugation ridge of one plate and the next adjacent ridge of said same plate cooperate with a ridge of a next adjacent plate and a next adjacent ridge of said next plate to define, at least in part, a cell; and
b. only one tab is positioned within said cell.

13. A system as defined in claim 1 wherein:
a. a corrugation ridge of one plate and the next adjacent ridge of said same plate cooperate with a ridge of a next adjacent plate and a next adjacent ridge of said next plate to define, at least in part, a cell; and
b. a plurality of tabs is positioned within said cell.

14. A system as defined in claim 1 arranged in series, generally along a flow axis of at least one said fluid, with one or more like systems such that the plates of next adjacent systems are mutually non-parallel.

15. A system as defined in claim 1 wherein at least one tab of a plate comprises a structural member providing support between next adjacent corrugation ridges of said plate.

16. A system as defined in claim 1 wherein:
a. at least one slot is defined, at least in part, by a shaped edge having at least one projection extending generally into said slot;
b. the corresponding tab includes a shaped edge having at least two projections protruding from said tab; and
c. a lip extends generally upward to permit liquid as one said fluid bridging said slot to pass to the underside of the plate corrugation.

17. A packing element for use in exchange apparatus wherein first and second fluids may interact, comprising:
a. a corrugated plate for positioning within said apparatus with the corrugations of said plate forming a non-parallel relationship with a flow axis within said apparatus of at least one of said fluids; and
b. said plate having at least one slot and corresponding tab connected to the plate at the ends of the slot, straddling a corrugation ridge with the tab extending from the slot and within the groove side of the corrugation.

18. A packing element as defined in claim 17 wherein at least one slot is defined, in part, by a shaped edge having at least one projection extending generally into the slot so that liquid as one said fluid may drip from said slot projection.

19. A packing element as defined in claim 18 wherein a projection of at least one slot is positioned generally over a tab so that said liquid may drip from said slot projection onto said tab.

20. A packing element as defined in claim 19 wherein said slots and tabs are partially displaced generally downward from corrugation ridges of said plate.

21. A packing element as defined in claim 17 wherein at least one tab includes a shaped edge having at least one projection protruding from said tab so that liquid as one said fluid may drip from said tab projection.

22. A packing element as defined in claim 17 further comprising a lip at the lower edge of at least one slot generally where said slot intersects a corrugation ridge of said plate, with said lip extending to permit liquid bridging said slot to pass to the underside of the plate corrugation.

23. A packing element as defined in claim 17 wherein each slot and corresponding tab are generally centered on a corrugation ridge of said plate.

24. A packing element as defined in claim 17 wherein each slot and corresponding tab are partially displaced generally downward from a corrugation ridge of said plate.

25. A packing element as defined in claim 17 wherein the material of said plate is, at least in part, generally continuous.

26. A packing element as defined in claim 17 wherein the material of said plate comprises a mesh.

27. A packing element as defined in claim 17 wherein said slots and tabs are arranged along said plate in a generally regular array.

28. A packing element as defined in claim 17 wherein at least one tab comprises a structural member providing support between next adjacent corrugation ridges of said plate.

29. A packing element as defined in claim 17 wherein:
a. at least one slot is defined, at least in part, by a shaped edge having at least one projection extending generally into said slot;
b. the corresponding tab includes a shaped edge having at least two projections protruding from said tab; and
c. a lip extends generally upward to permit liquid as one said fluid bridging said slot to pass to the underside of the plate corrugation.

30. A method of operating an exchange process between two fluids comprising the following steps:
a. providing a plurality of corrugated plates positioned, within an exchange chamber, mutually parallel, with the corrugations of each of said plates forming a non-parallel relationship with the corrugations of the next corrugated plate;
b. providing one or more plates with one or more slots and corresponding tabs, with each slot straddling a corrugation ridge and the corresponding tab connected to the plate at the ends of the slot and extending from the slot and within the groove side of the corrugation; and
c. flowing said first and second fluids through said plurality of plates.

31. A method as defined in claim 30 further comprising the step of dripping a liquid as one such fluid through said plurality of plates.

32. A method as defined in claim 31 wherein at least one slot is defined, in part, by a shaped edge having at least one projection protruding generally into the slot and from which said liquid may drip.

33. A method as defined in claim 32 wherein said liquid dripping from said slot projection may fall on a tab.

34. A method as defined in claim 30 further comprising the step of dripping a liquid as one such fluid from a tab.

35. A method as defined in claim 30 further comprising the step of providing said plates positioned so that a corrugation ridge of one plate and a next adjacent ridge of said same plate cooperate with a ridge of a next adjacent plate and a next adjacent ridge of said second plate to define, at least in part, a cell.

36. A method as defined in claim 35 wherein only one tab is positioned within said cell.

37. A method as defined in claim 35 wherein a plurality of tabs is positioned within said cell.

38. A method as defined in claim 30 further comprising the step of providing a lip at the lower edge of at least one slot generally where the slot intersects a corrugation ridge of a plate, with said lip extending to permit liquid as one such fluid bridging the slot to pass to the underside of the plate corrugation.

39. A packing system for use in an exchange chamber wherein two fluids may interact, comprising:
   a. a plurality of corrugated plates positioned mutually parallel, with the corrugations of each of said plates forming a non-parallel relationship with the corrugations of the next corrugated plate;
   b. at least one of said plates comprising at least two slots with each slot straddling a corrugation ridge, with a tab, connected to the plate, extending from each slot and within the groove side of the corrugation; and
   c. at least one slot comprising a shaped edge having at least one projection extending generally into said slot so that liquid as one said fluid may drip from at least one said slot projection;
   d. wherein a projection of at least one slot may be positioned generally over a tab so that said liquid may drip from said slot projection onto said tab.

40. A system as defined in claim 39 wherein at least one tab includes a shaped edge having at least one projection protruding from said tab so that liquid as one said fluid may drip from said tab projection.

41. A system as defined in claim 39 further comprising a lip at the lower edge of at least one slot generally where said slot intersects a corrugation ridge of a plate, with said lip extending to permit liquid as one said fluid bridging said slot to pass to the underside of the plate corrugation.

42. A system as defined in claim 39 wherein:
   a. at least one slot is defined, at least in part, by a shaped edge having at least one projection extending generally into said slot;
   b. the corresponding tab includes a shaped edge having at least two projections protruding from said tab; and
   c. a lip extends generally upward to permit liquid as one said fluid bridging said slot to pass to the underside of the plate corrugation.

43. A packing element for use in exchange apparatus wherein first and second fluids may interact, comprising:
   a. a corrugated plate for positioning within said apparatus with the corrugations of said plate forming a non-parallel relationship with a flow axis within said apparatus of at least one of said fluids; and
   b. said plate having at least two slots with each slot straddling a corrugation ridge, with a tab, connected to the plate, extending from each slot and within the groove side of the corrugation; and
   c. at least one slot comprising a shaped edge having at least one projection extending generally into the slot so that liquid as one said fluid may drip from said slot projection;
   d. wherein a projection of at least one slot may be positioned generally over a tab so that said liquid may drip from said slot projection onto said tab.

44. A packing element as defined in claim 43 wherein at least one tab includes a shaped edge having at least one projection protruding from said tab so that liquid as one said fluid may drip from said tab projection.

45. A packing element as defined in claim 43 further comprising a lip at the lower edge of at least one slot generally where said slot intersects a corrugation ridge of said plate, with said lip extending to permit liquid bridging said slot to pass to the underside of the plate corrugation.

46. A packing element as defined in claim 43 wherein:
   a. at least one slot is defined, at least in part, by a shaped edge having at least one projection extending generally into said slot;
   b. the corresponding tab includes a shaped edge having at least two projections protruding from said tab; and
   c. a lip extends generally upward to permit liquid as one said fluid bridging said slot to pass to the underside of the plate corrugation.

47. A method of operating an exchange process between two fluids, including a liquid, comprising the following steps:
   a. providing a plurality of corrugated plates positioned, within an exchange chamber, mutually parallel, with the corrugations of each of said plates forming a non-parallel relationship with the corrugations of the next corrugated plate;
   b. providing one or more plates with at least two slots with each slot straddling a corrugation ridge, with a tab, connected to the plate, extending from each slot and within the groove side of the corrugation;
   c. providing at least one slot defined, in part, by a shaped edge having at least one projection protruding generally into the slot; and
   d. flowing said fluids through said plurality of plates whereby said liquid may drip from said slot projection onto a tab.

48. A method as defined in claim 47 further comprising the step of dripping said liquid from a tab.

49. A method as defined in claim 47 further comprising the step of providing a lip at the lower edge of at least one slot generally where the slot intersects a corrugation ridge of a plate, with said lip extending to permit liquid bridging the slot to pass to the underside of the plate corrugation.

* * * * *